United States Patent [19]

Yoneda et al.

[11] Patent Number: 4,988,937

[45] Date of Patent: Jan. 29, 1991

[54] SYNCHRONOUS CONTROL SYSTEM AND METHOD THEREFOR

[75] Inventors: Takao Yoneda, Nagoya; Hiroshi Nakano, Toyota; Toshihiro Yonezu, Nishio, all of Japan

[73] Assignee: Toyoda Koki Kabushiki Kaisha, Kariya, Japan

[21] Appl. No.: 485,567

[22] Filed: Feb. 27, 1990

[30] Foreign Application Priority Data

Feb. 28, 1989 [JP]  Japan .................. 64-49473

[51] Int. Cl.⁵ ................... G05B 11/06; H02P 7/74; B24B 47/00
[52] U.S. Cl. ..................... 318/675; 318/41; 318/61; 318/77; 318/85; 318/603
[58] Field of Search .................. 318/77, 85, 569, 570, 318/, 571, 600, 618, 625, 675, 41, 45, 46, 47, 50, 59, 61, 64, 66, 67, 68, 69, 70, 603; 364/474.28

[56] References Cited

U.S. PATENT DOCUMENTS

| | | | |
|---|---|---|---|
| 3,906,313 | 9/1975 | Danis et al. | 318/85 |
| 3,906,327 | 9/1975 | O'Callaghan et al. | 318/603 |
| 3,919,614 | 11/1975 | Wespi | 318/603 X |
| 3,997,828 | 12/1976 | Bottcher et al. | 318/603 |
| 4,000,449 | 12/1976 | Gripp | 318/85 |
| 4,056,763 | 11/1977 | Debrie et al. | 318/85 X |
| 4,405,884 | 9/1983 | Weber | 318/85 |
| 4,414,495 | 11/1983 | Sumi et al. | 318/85 X |
| 4,565,950 | 1/1986 | Kikuno | 318/85 |
| 4,617,498 | 10/1986 | Ruppert | 318/85 |
| 4,712,048 | 12/1987 | Rebsamen | 318/41 X |
| 4,906,908 | 3/1990 | Papiernik et al. | 318/600 |
| 4,916,367 | 4/1990 | Yamaguchi et al. | 318/603 X |

Primary Examiner—Bentsu Ro
Attorney, Agent, or Firm—Oblon, Spivak, McClelland, Maier & Neustadt

[57] ABSTRACT

A synchronous control system for a pair of spindles of a machine tool including a master spindle and a slave spindle. Current positions of the main spindles are detected, and a deviation between the detected current positions is calculated. In case the deviation is within 180 degrees, the current position of one of the main spindles which precedes in the forward direction of rotation is determined as a target position for positioning. In case the deviation is greater than 180 degrees, the detected current position of the master spindle or the slave spindle is offset by an amount equal to an integral number of times 180 degrees so that the deviation between current positions of the main spindles after such offset is within 180 degrees. Then, that one of the current position of the main spindle thus offset and the current position of the other main spindle not offset which precedes in the forward direction of rotation is determined as a common target position for positioning. When a positioning instruction is provided by an operator, the main spindle which follows in the forward direction of rotation is controlled so that the position of rotation of the following main spindle approaches the target position.

4 Claims, 5 Drawing Sheets

SYNCHRONOUS CONTROL SYSTEM AND METHOD THEREFOR

BACKGROUND OF THE INVENTION

1. Field of the Invention

This invention relates to a synchronous control system for synchronously controlling positions of rotation of a pair of main spindles of a machine tool including a master spindle and a slave spindle between and by which a work is to be supported for rotation at the opposite ends thereof (such a position of rotation will be hereinafter referred to only as "position").

2. Description of the Prior Art

In an apparatus of the type mentioned, working is required to position, upon preparation for operation of the apparatus, the master spindle and the slave spindle to a common target position of a same phase.

In such positioning, if the common target position is fixed to a current position of one of the main spindles, for example, the master spindle, then the slave spindle will be rotated to adjust the position thereof to the current position of the master spindle.

In this instance, if it is tried to make such positioning within a minimum angle of rotation, the slave spindle may have to be rotated reversely.

However, the two spindles including the master spindle and the slave spindle described above are connected to respective servomotors each by way of a gear box disposed on a spindle stock. Accordingly, since there is some backlash present in a gear system, there is a problem that reverse rotation of one of the main spindles has a bad influence on accuracy in positioning thereof.

On the other hand, when the slave spindle is rotated always in the forward direction to adjust the position thereof to the current position of the master spindle, the angle of rotation of the slave spindle is sometimes greater than a half cycle of rotation of the main spindles, that is, greater than 180 degrees. The angle of rotation greater than 180 degrees is not desirable for working for preparation for operation of the apparatus.

SUMMARY OF THE INVENTION

Accordingly, it is a first object of the present invention to provide a synchronous control system and method therefore wherein a master spindle or a slave spindle is rotated in a forward direction corresponding to a direction of rotation of the main spindles for working to effect positioning thereof in order to improve the accuracy in positioning between the master spindle and the slave spindle.

It is a second object of the present invention to provide a synchronous control system which enables positioning of two main spindles by rotation within a minimum angle of rotation.

It is a third object of the present invention to provide a synchronous control system which improves the workability and safety in preparation for operation by positioning of two main spindles by rotation within a minimum angle.

A synchronous control system of the present invention achieves, when a work is to be supported for rotation between and by two main spindles including a master spindle and a slave spindle, positioning of the master spindle and the slave spindle efficiently with safety.

Current positions of the master spindle and the slave spindle are detected as a master spindle current position and a slave spindle current position, respectively. A deviation between the thus detected master spindle current position and slave spindle current position is calculated.

In case the deviation is within a half cycle of rotation of the main spindles, that one of the detected master spindle current position and slave spindle current position which precedes in the forward direction of rotation is calculated as a common target position to the master spindle and the slave spindle.

On the other hand, in case the deviation between the master spindle current position and the slave spindle current position is greater than a half cycle of rotation of the main spindles, the detected master spindle current position or slave spindle current position is offset corrected by an amount equal to an integral number of times one cycle of rotation of the main spindles so that the deviation between two current position after such offset correction may be within a half cycle of rotation of the main spindles. Then, that one of the master spindle current position or the slave spindle current position thus offset corrected and the master spindle current position or the slave spindle current position not offset corrected which precedes the other in the forward direction of rotation is set as a common target position to the master spindle and the slave spindle.

When a positioning instruction is provided by an operator or the like, actual positions of the two main spindles are controlled with respect to the thus determined common target position.

As a result, the positioning control is continued until the position of the main spindle which follows the other main spindle within a half cycle of rotation of the main spindles in the forward direction of rotation coincides with the position of the main spindle which precedes. Accordingly, even if the master spindle and the slave spindle are in a stopped condition in any phase relationship, they can be positioned by rotation in the forward direction within a half cycle of rotation of the spindles.

DESCRIPTION OF THE INVENTION

Figure 1:
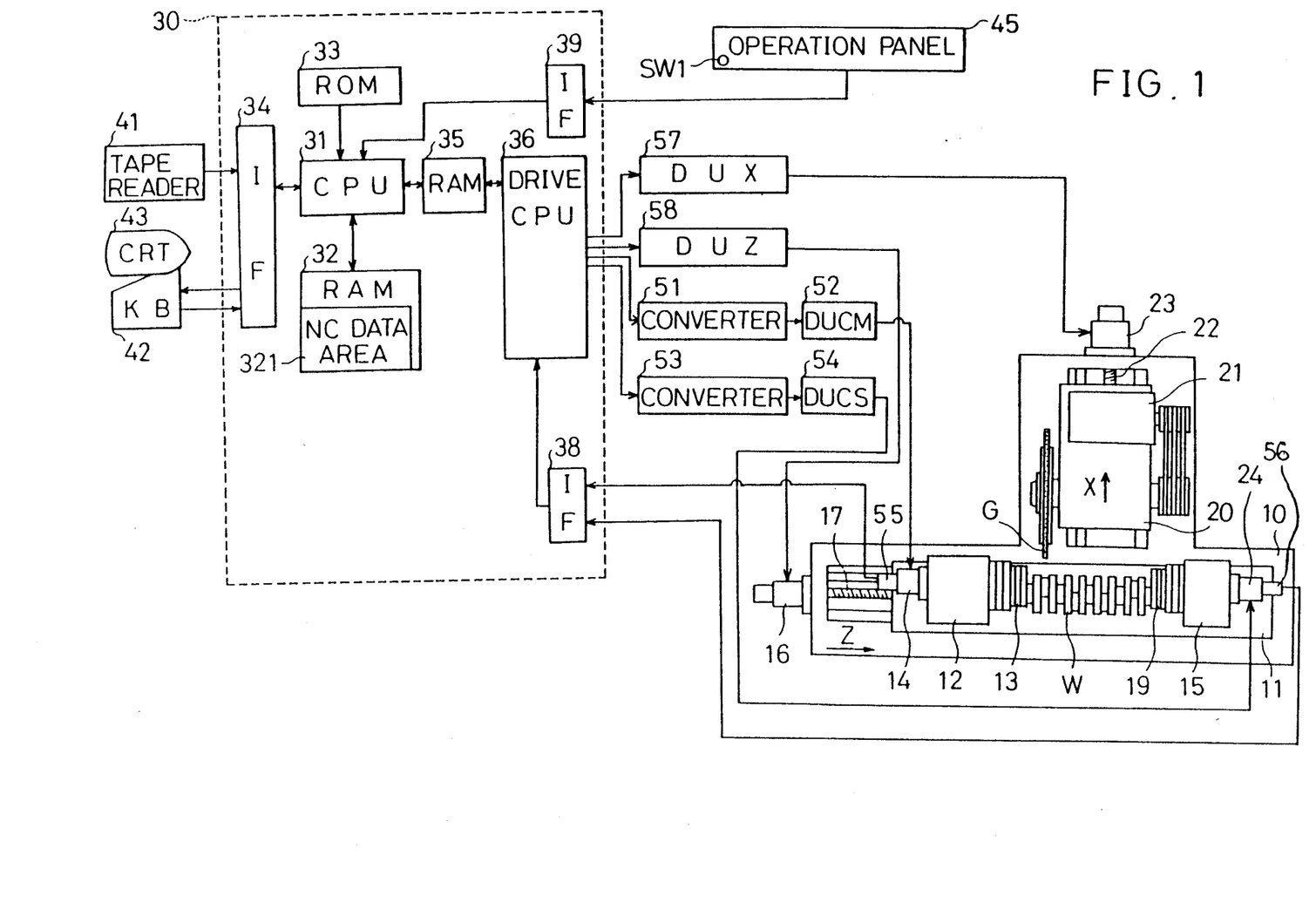
FIG. 1 is a block diagram showing mechanical construction and electric construction of a CNC grinding machine which is provided with a synchronous control system according to a preferred embodiment of the present invention.

Referring to FIG. 1, a table 11 is disposed for sliding movement in a Z-axis direction parallel to a main spindle axis on a bed 10 of a CNC grinding machine and is connected to be driven by a servomotor 16 by way of a feed screw 17. A pair of spindle stocks 12 and 15 are disposed on the table 11, and a master spindle 13 is supported for rotation on the spindle stock 12 while a slave spindle 19 is supported for rotation on the other spindle stock 15. The master spindle 13 and the slave spindle 19 are connected to be rotated by a master servomotor 14 and a slave servomotor 24, respectively. A work W in the form of a crank shaft is fixed to the master spindle 13 and the slave spindle 19 by means of chuck mechanisms (not shown) provided on the spindles 13 and 19.

A tool slide 20 is mounted at a rear portion of the bed 10 for movement toward and away from the work W, and a grinding wheel G is supported for rotation on the tool slide 20 and is connected to be driven to rotate by a motor 21. The tool slide 20 is connected to a servomotor 23 by way of a screw 22 so that it may be moved forwardly and rearwardly by forward rotation and reverse rotation of the servomotor 23.

A master drive circuit is constituted from a digital to analog converter 51 and a drive unit 52 while a slave drive circuit is constituted from another digital to analog converter 53 and another drive unit 54. A velocity instruction is delivered from a drive CPU 36 of a numerically controlling device 30 to each of the digital to analog converters 51 and 53, and the master servomotor 14 and the slave servomotor 24 are driven to rotate at such instructed velocities by way of the drive units 52 and 54, respectively. A pair of absolute encoders (A/Es) 55 and 56 are connected to the master servomotor 14 and the slave servomotor 24 for detecting current positions of rotation of the latter as absolute positions, respectively, and output signals of the absolute encoders 55 are 56 are coupled to the drive CPU 36 by way of an interface 38 of the numerically controlling device 30.

Meanwhile, a drive unit 57 for an X-axis drive circuit and another drive unit 58 for a Z-axis drive circuit are connected to the drive CPU 36. Incremental movement pulses are delivered from the drive CPU 36 to the drive units 57 and 58. As a result, the servomotors 23 and 16 are individually driven at a velocity corresponding to a pulse period until positions instructed with a number of such incremental movement pulses are reached.

The numerically controlling device 30 is provided to numerically control rotation mainly of control axes, to control grinding operation on the work W and dressing operation on the grinding wheel G. The numerically controlling device 30 is constituted mainly from a CPU 31 for controlling the CNC grinding machine, a ROM 33 in which a control program is stored, and a RAM 32 for storing input data and so forth therein. A working NC data area 321 for storing NC data therein is formed in the RAM 32.

The numerically controlling device 30 further includes the drive CPU 36 and a RAM 35 as a driving system for the servomotors 14, 16, 23 and 24. The RAM 35 serves as a storage device for receiving from the CPU 31 and storing therein positioning data for the grinding wheel G, table 11, master spindle 13 and slave spindle 19. The drive CPU 36 develops a number of pulses corresponding to an amount of movement for the X- or Z-axis at an interval corresponding to the velocity of movement. Further, the drive CPU 36 calculates interpolation target positions based upon given positioning target points for the master spindle 13 and the slave spindle 19 and further calculates positioning deviations between the current positions and the interpolation target positions regarding the master spindle 13 and the slave spindle 19. Then, a velocity signal is delivered to the digital to analog converter 51 or 53 in accordance with the positioning deviations. Further, the drive CPU 36 receives output values of the absolute encoder (A/E) 55 for the master spindle 13 serving as a first position detector and the absolute encoder (A/E) 56 for the slave spindle 19 serving as a second position detector, and those values are read by the CPU 31 by way of the RAM 35. Further, the drive CPU 36 executes control of slow-up and slow-down in order to achieve smooth starting and stopping of the individual control axes.

Meanwhile, a tape reader 41 for the entry of data and so forth, a keyboard 42 for the entry of data and a CRT display unit 43 for displaying data thereon are connected to the CPU 31 by way of another interface 34. Further, an operation panel 45 for the entry of a signal of a working starting instruction or the like is connected to the CPU 31 by way of a further interface 39.

Subsequently, operation of the synchronous control system will be described.

Figure 2A:
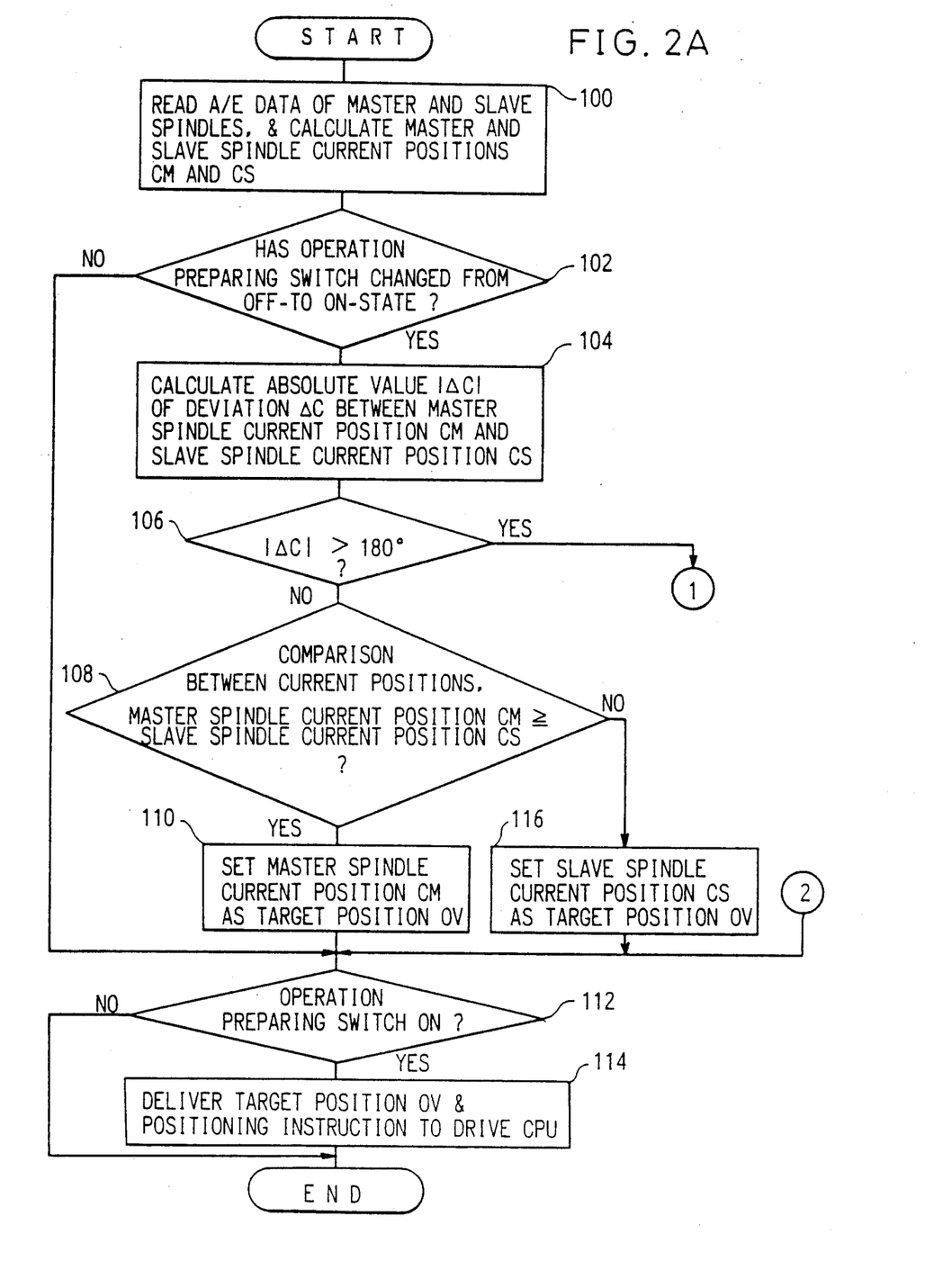
FIGS. 2A and 2B are flow charts illustrating a processing procedure of a CPU 31 of a numerically controlled machine 30 of the embodiment of FIG. 1.
Figure 2B:
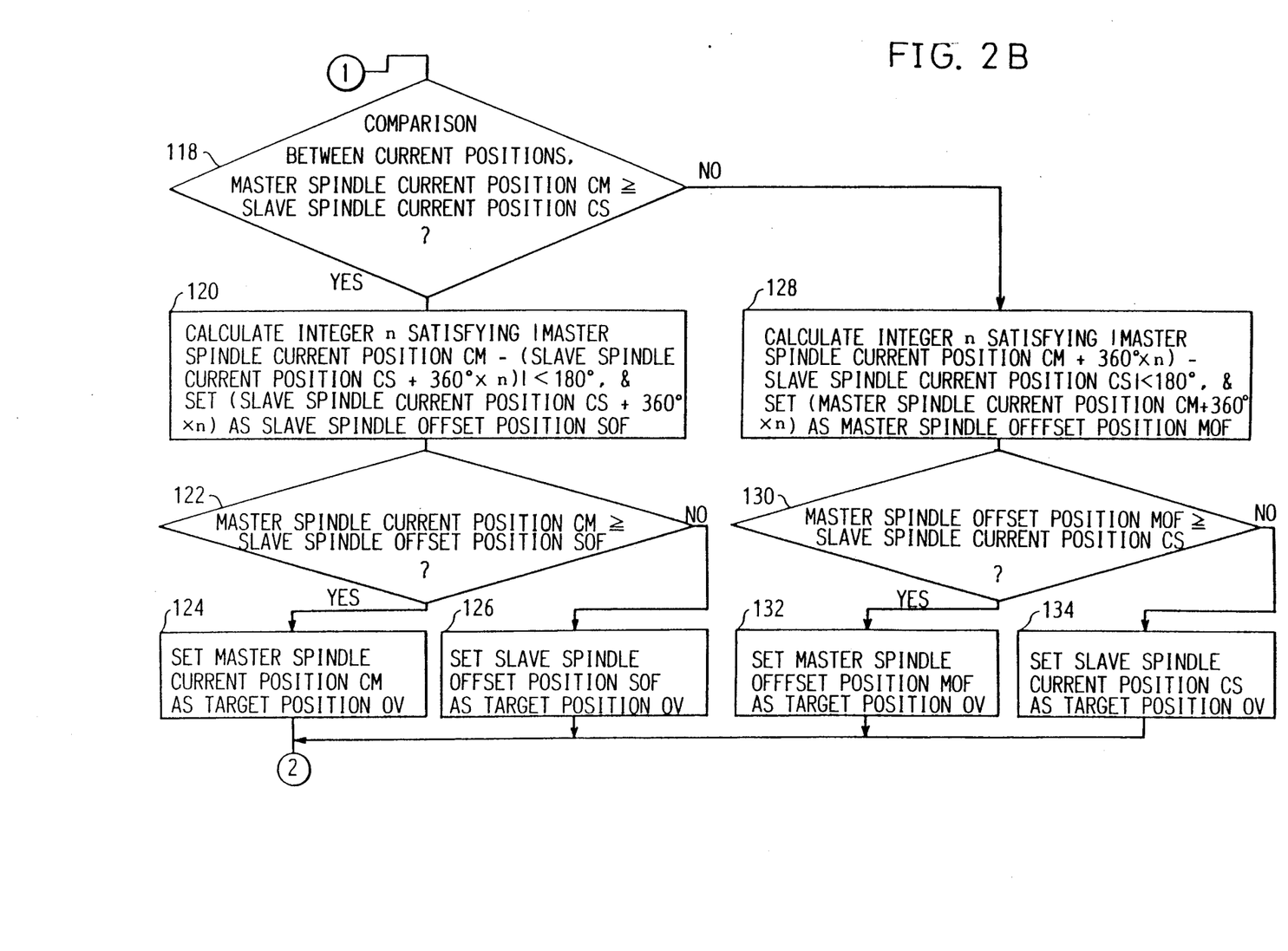
Figure 3A:
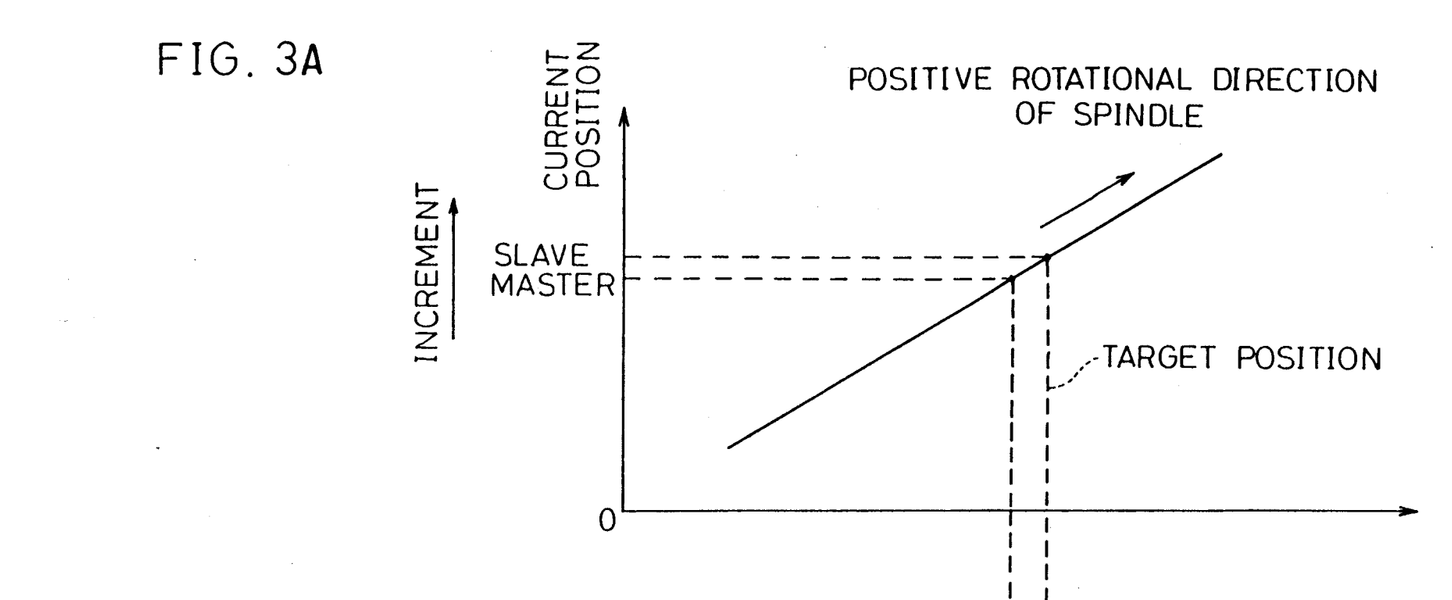
FIGS. 3A and 3B are diagrammatic representation illustrating a relationship between current positions and a target position when the deviation between the current positions of a master spindle and a slave spindle in the system of the present embodiment is within 180 degrees.
Figure 3B:
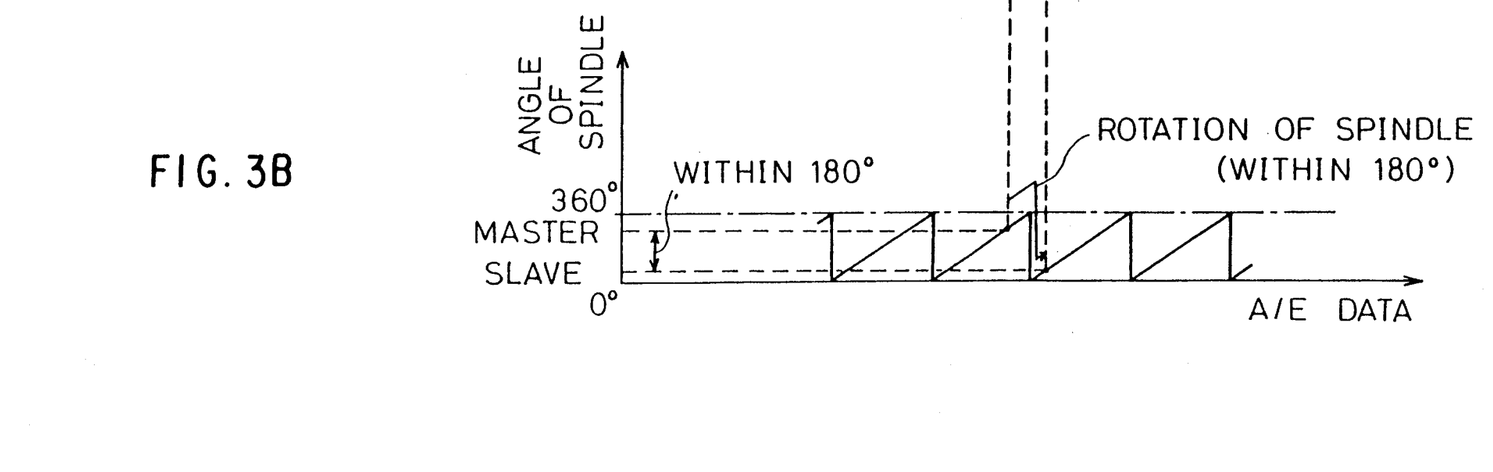
Figure 4A:
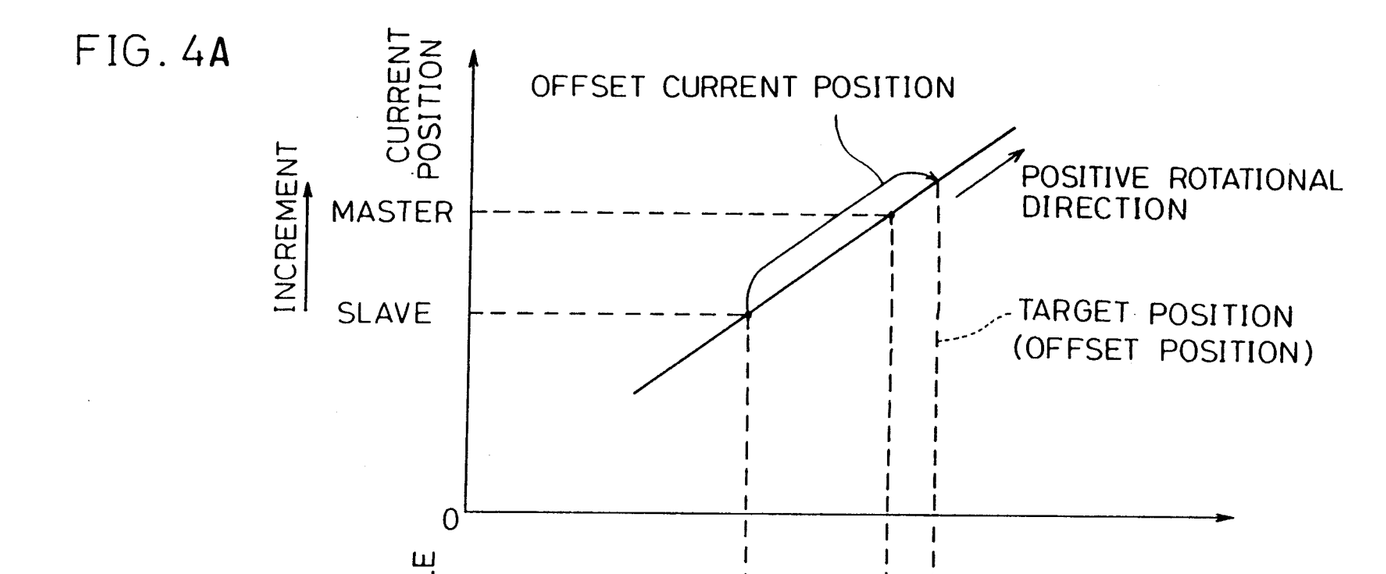
FIGS. 4A and 4B are diagrammatic representation illustrating a relationship among current positions, an offset position and a target position when the deviation between the current positions of the master spindle and the slave spindle in the system of the
present embodiment exceeds 180 degrees.
Figure 4B:
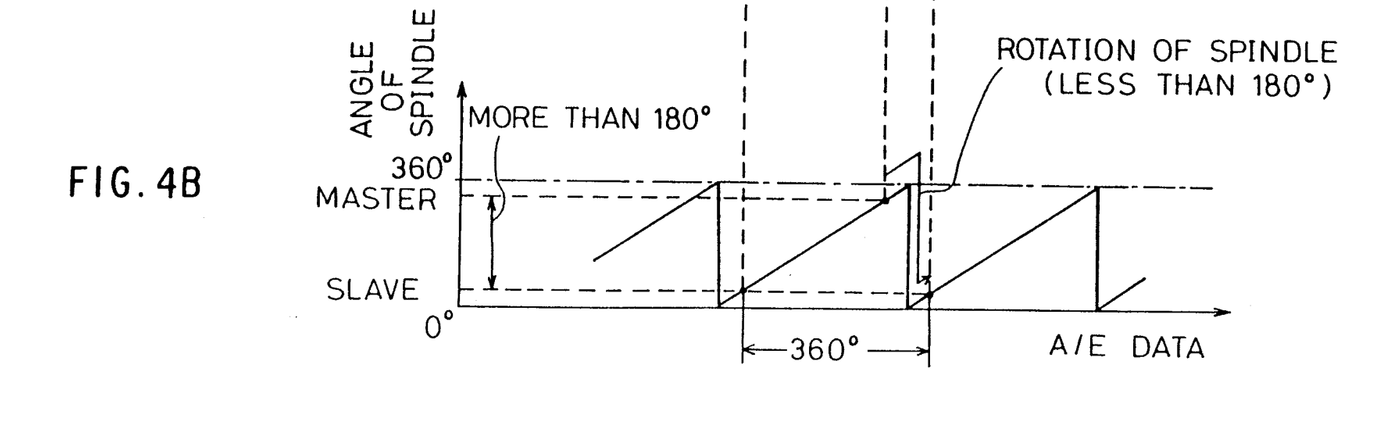

FIGS. 2A and 2B are flow charts illustrating a processing procedure of the CPU 31 which is executed for each 2 ms in response to a real time clock (RTC) generated in the numerically controlling device 30, and which is a component of the synchronous control system of the present embodiment. Meanwhile, FIGS. 3 and 4 are diagrammatic representations illustrating a method of setting a target position. The flow charts of FIGS. 2A and 2B are described with reference to FIGS. 3 and 4.

At first at step 100, output values of the absolute encoders (A/Es) 55 and 56 for the master spindle 13 and the slave spindle 19 are read by way of the drive CPU 36 and the RAM 35. Such output values of the absolute encoders 55 and 56 can represent values within an angular range corresponding to 50 rotations of the main spindles. In other words, the output values of the absolute encoders 55 and 56 represent angular positions within the range from 0 degree to 18,000 degrees. The CPU 31 calculates a current position CM of the master spindle 13 and a current position CS of the slave spindle 19 in accordance with the output values of the absolute encoders 55 and 56, and stores in the RAM 32 data indicating the current positions CM and CS.

Subsequently at step 102, it is judged whether or not an operation preparing switch SW1 of the operation panel 45 has been changed over from an off-state to an on-state, that is, whether or not an instruction for preparation for operation has just been provided. The result of judgment at step 102 is YES only in case the operation preparing switch SW1 has been changed over from an off-state to an on-state, and in this instance, the current process of the CPU 31 advances to step 104 which constitutes a deviation calculating means. At step 104, an absolute value of a deviation $\Delta C$ between the master spindle current position CM and the slave spindle current position CS is calculated in accordance with the following expression:

$$\Delta C = |CM - CS|$$

Subsequently, the current process of the CPU 31 advances to step 106 at which it is judged whether or not the absolute value of the deviation calculated at step 104 exceeds 180 degrees which is a half cycle of rotation of the main spindles. In case the absolute value of the deviation calculated at step 104 does not exceed 180 degrees (refer to (a) and (b) of FIG. 3), the result of judgment at step 106 is NO, and the process of the CPU 31 advances to step 108.

At step 108, magnitudes of the master spindle current position CM and the slave spindle current position CS are compared with each other. In other words, it is judged whether or not the following inequality is satisfied;

$$CM \geq CS$$

Satisfaction of the inequality signifies that the master spindle current position CM precedes to the slave spindle current position CS within a range smaller than 180 degrees in the forward direction of rotation. When the inequality is satisfied, the result of judgment at step 108 is YES, and in this instance, the process of the CPU 31 advances to step 110 at which the master spindle current position CM is set as a target position OV, whereafter the process of the CPU 31 advances to step 112.

On the contrary, dissatisfaction of the inequality at step 108 signifies that the slave spindle current position CS precedes to the master spindle current position CM within a range smaller than 180 degrees in the forward direction of rotation (refer to (a) and (b) of FIG. 3). Accordingly, in case it is judged that the inequality is not satisfied, the process of the CPU 31 advances to step 116. At step 116, the slave spindle current position CS is set as a target position OV, and after then, the process of the CPU 31 advances to step 112.

At step 112, it is judged whether or not the operation preparing switch SW1 is in an on-state. In case the operation preparing switch SW1 is in an on-state, that is, in case the operation preparing switch SW1 still remains in an on-state, the process of the CPU 31 advances to step 114. At step 114, a positioning instruction is provided to the drive CPU 36 together with the target position OV, thereby completing the execution of the program for one cycle.

Upon reception of the position instruction, the drive CPU 36 executes positioning control of the master spindle 13 and the slave spindle 19. In such positioning control, a distance to the thus provided target position OV is interpolated for each fixed very short period of time to produce an interpolation target position, and a deviation of the interpolation target position from the detected current position CM or CS is calculated. Then, a velocity signal corresponding to the thus calculated deviation is delivered to the digital to analog converter 51 or 53. Then, when the interpolation target position reaches to the target position OV to reduce the deviation between the target position OV and the master spindle current position CM or the slave spindle current position CS to zero, the velocity signal is reduced to zero. Consequently, the master spindle 13 and the slave spindle 19 are both positioned to the target position OV.

In this instance, only that one of the main spindles which follows the other is rotated in the forward direction of rotation within the range of 180 degrees. On the other hand, the other main spindle which precedes is held positioned at the target position OV in a servo lock condition.

It is to be noted that, in case the operation preparing switch SW1 is not in an on-state at step 112, that is, in case an operator does not want to rotate the main spindles by some reasons and gives up its depression of the operation preparing switch SW1, the program comes to an end without executing the process at step 114. Then, the program described above is started again in response to an RTC generated after 2 ms. Accordingly, only when the operation preparing switch SW1 continues to be depressed, the process at step 114 is executed to carry out positioning of the master spindle 13 and the slave spindle 19.

On the other hand, in case it is judged at step 106 that the absolute value $|\Delta C|$ of the deviation AC between the master spindle current position CM and the slave spindle current position CS exceeds 180 degrees (refer to FIG. 4), the processes at steps starting from step 118 are executed.

At step 118, magnitudes of the master spindle current position CM and the slave spindle current position CS are compared with each other similarly as at step 108. In case the master spindle current position CM precedes to the slave spindle current position CS in the forward direction of rotation, n which satisfies the following inequality is calculated at step 120:

$$|CM - (CS + 360° \times n)| < 180°$$

where n is a value which represents a number of rotations by which the slave spindle 19 follows the master spindle 13.

Then, using such n, a slave spindle offset position SOF is calculated in accordance with the following expression:

$$SOF = CS + 360° \times n$$

If the phases of rotation of the main spindles are considered within the range from 0 to 360 degrees, then the slave spindle offset position SOF and the slave spindle current position CS are equal in phase to each other. Meanwhile, the slave spindle current position CS which is supervised by the CPU 31 is corrected to the slave spindle offset position SOF. Namely, the data stored in RAM 32 indicating the slave current position CS is replaced with data indicating the offset position SOF.

Subsequently at step 122, magnitudes of the master spindle current position CM and the slave spindle offset position SOF are compared with each other. In particular, it is judged whether or not the following inequality is satisfied:

$$CM \geq SOF$$

In case the inequality is satisfied, that is, in case the master spindle current position CM precedes to the slave spindle offset position SOF in the forward direction of rotation, the process of the CPU 31 advances to step 124. At step 124, the target position OV is set as the master spindle current position CM which precedes. Then, the process of the CPU 31 advances to step 112, and then, if it is judged at step 112 that the operation preparing switch SW1 is in an on-state similarly as described hereinabove, the process of the CPU 31 advances to step 114 at which a positioning instruction is delivered to the drive CPU 36 together with the target position OV. As a result, the slave spindle 19 is positioned so that the position thereof may be equal in phase to the master spindle current position CM, while the master spindle 13 is held at the original position in a servo locked state because the master spindle current position CM is equal to the target position OV. In this instance, the angle of rotation of the slave spindle 19 is within 180 degrees, because the data indicating the slave current position CS has been replaced with the data indicating the slave spindle offset position SOF.

On the other hand, in case it is judged at step 122 that the inequality given hereinabove is not satisfied (refer to FIG. 4), the slave spindle offset position SOF is set as the target position OV at step 126. Then, the process of the CPU 31 advances by way of the step 112 to step 114 at which a positioning instruction is delivered together with the target position OV. As a result, the master spindle 13 is rotated to be positioned to the same phase as the slave spindle 19, while the slave spindle 19 is held at the original position in a servo locked state because the data indicating the slave current position CS has been replaced with the data indicating the offset position SOF which is equal to the target position OV. In this instance, the angle of rotation of the master spindle 13 is within 180 degrees in the forward direction of rotation, because the target position OV is equal to the slave spindle offset position SOF.

In the meantime, in case it is judged at step 118 that the slave spindle current position CS precedes to the master spindle current position CM in the forward direction of rotation, the process of the CPU 31 advances to step 128.

At step 128, n which satisfies the following inequality is calculated similarly as at step 120:

$$|(CM+360° \times n)-CS| < 180°$$

Then, a master spindle offset position MOF is calculated in accordance with the following equation:

$$MOF = CM + 360° \times n$$

Further, the master spindle current position CM which is supervised by the CPU 31 is corrected to the master spindle offset position MOF. Namely, the data stored in RAM 32 indicating the master current position CM is replaced with the data indicating the offset position MOF.

At subsequent step 130, magnitudes of the master spindle offset position MOF and the slave spindle current position CS are compared with each other similarly as at step 122. In other words, it is judged whether or not the following inequality is satisfied:

$$MOF \geq CS$$

In case the inequality is satisfied, the master spindle offset position MOF is set as the target position OV at step 132. Then, the process of the CPU 31 advances by way of step 112 to step 114 at which a positioning instruction is delivered to the drive CPU 36 together with the target position OV. As a result, the slave spindle 19 is rotated to be positioned to the same phase as the master spindle 13, while the master spindle 13 is held at the original position in a servo locked state because the data indicating the master spindle current position CM has been replaced with the data indicating the master spindle offset position MOF which is equal to the target position OV. In this instance, the angle of rotation of the slave spindle 19 is within 180 degrees in the forward direction of rotation, because the target position OV is equal to the master spindle offset position MOF.

On the other hand, in case it is judged at step 130 that the slave spindle current position CS precedes to the master spindle offset position MOF in the forward direction of rotation, the process of the CPU 31 advances to step 134. Then at step 134, the slave spindle current position CS is set as the target position OV. The process of the CPU 31 then advances by way of step 112 to step 114 at which a positioning instruction is delivered to the drive CPU 36 together with the target position OV. As a result, the master spindle 13 which follows the slave spindle 19 is rotated to be positioned to the same phase as the slave spindle 19 which precedes, while the slave spindle 19 is held at the original position in a servo locked state because the slave spindle current position CS is equal to the target position OV. In this instance, the angle of rotation of the master spindle 13 is within 180 degrees in the forward direction of rotation, because the data indicating the master current position CM has been replaced with the data indicating the offset position MOF.

It is to be noted that, with the program described above, a first target position setting means is attained by the steps 106, 108 and 110 while an offset means is attained by the steps 106, 118, 120 and 128. Further, a second target position setting means is attained by the steps 122, 124, 126, 130, 132 and 134.

Since rotation of the main spindles is endless, it is a question how to define, in an actual positional relationship between the master spindle 13 and the slave spindle 19, one of the main spindles as a preceding main spindle and the other spindle as a following main spindle as described above. According to the present invention, one of the two main spindles which precedes to the other in the forward direction of rotation in a sectoral area of an angle smaller than 180 degrees which is defined by current positions of the two main spindles is defined as a preceding main spindle while the other main spindle is defined as a following main spindle. Then, the following main spindle is rotated in the forward direction to be adjusted to the position of the preceding main spindle.

Further, in the embodiment described above, when a detected current position is to be offset, it is offset in the forward direction of rotation. In particular, the current position in supervision of the following main spindle is advanced by an amount equal to an integral number of times a cycle of rotation of the main spindles by offset correction. However, the current position in supervision of the preceding main spindle may alternatively be retracted by an amount equal to an integral number of times a cycle of rotation of the main spindles by offset correction. In summary, one of current positions in supervision of the two main spindles should be corrected by offset correction so that the deviation between the current positions may be smaller than one half of a cycle of rotation of the main spindles.

We claim:

1. A method for controlling rotational positions of a master spindle and a slave spindle, wherein said method comprises:

detecting the current positions of said master and slave spindles;

comparing the detected current positions of said master and slave spindles in order to judge which one of said master and slave spindles precedes to the other in the forward rotational direction;

setting the current position of preceding one of said main and slave spindles as a common target position for said master and slave spindles; and rotating the other of said main and slave spindles to the common target position in order to position said master and slave spindles at the same rotational angle.

2. A synchronous control system for synchronously controlling positions of rotation of a pair of main spindles including a master spindle and a slave spindle between and by which a work is to be supported for rotation at the opposite end faces thereof so as to provide a turning force to the work, comprising:
   a first position detector for detecting a current position of said master spindle;
   a second position detector for detecting a current position of said slave spindle;
   target position setting means for setting that one of the master spindle current position and the slave spindle current position detected by said first and second position detectors, respectively, which precedes to the other in the forward direction of rotation as a common target position to said master spindle and said slave spindle; and
   instruction signal developing means for developing, when a positioning instruction is received, an instruction signal for instructing a rotational movement of one of the main spindles which follows the other of the main spindles in the forward direction of rotation to the common target position set by said target position setting means.

3. A synchronous control system according to claim 2, wherein said first and second position detectors are absolute angular position detectors for detecting current positions of said master spindle and said slave spindle, respectively, within an angular range corresponding to a predetermined integral number of times a cycle of rotation of said main spindles.

4. A synchronous control system for synchronously controlling positions of rotation of a pair of main spindles including a master spindle and a slave spindle between and by which a work is to be supported for rotation at the opposite end faces thereof so as to provide a turning force to the work, comprising:
   a first position detector for detecting a current position of said master spindle;
   a second position detector for detecting a current position of said slave spindle;
   deviation calculating means for calculating a deviation between the master spindle current position detected by said first position detector and the slave spindle current position detected by said second position detector;
   first target position setting means for setting, in case the deviation calculated by said deviation calculating means is within a half cycle of rotation of said main spindles, that one of the master spindle current position and the slave spindle current position detected by said first and second position detectors, respectively, which precedes to the other in the forward direction of rotation as a common target position to said master spindle and said slave spindle;
   offset means for offsetting, when the deviation calculated by said deviation calculating means exceeds a half cycle of rotation of said main spindles, either the master spindle current position detected by said first position detector or the slave spindle current position detected by said second position detector by an amount equal to an integral number of times an angle of one cycle of rotation of said main spindles so that the deviation between two current positions of said master spindle and said slave spindle after such offset may be within a half cycle of rotation of said main spindles;
   second target position setting means for setting that one of the master spindle current position or the slave spindle current position corrected by said offset means and the master spindle current position or the slave spindle current position not corrected by said offset means which precedes to the other in the forward direction of rotation as a common target position to said master spindle and said slave spindle; and
   instruction signal developing means for developing, when a positioning instruction is received, an instruction signal for instructing a rotational movement of one of the main spindles which follows the other of the main spindles in the forward direction of rotation to the common target position set either by said first target position setting means or by said second target position setting means.

* * * * *